(12) United States Patent
Kawamura et al.

(10) Patent No.: US 7,566,439 B2
(45) Date of Patent: Jul. 28, 2009

(54) PEROVSKITE CERAMIC POWDER AND ELECTRONIC COMPONENT USING SAME AND MANUFACTURING METHODS THEREOF

(75) Inventors: Chie Kawamura, Tokyo (JP); Atsushi Tanada, Tokyo (JP); Hirokazu Chazono, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 104 days.

(21) Appl. No.: 11/606,102

(22) Filed: Nov. 30, 2006

(65) Prior Publication Data

US 2007/0104640 A1     May 10, 2007

Related U.S. Application Data

(62) Division of application No. 10/807,157, filed on Mar. 24, 2004, now Pat. No. 7,271,114.

(30) Foreign Application Priority Data

Mar. 24, 2003     (JP) .............................. 2003-080407

(51) Int. Cl.
*C01F 11/00*     (2006.01)
*C01G 23/04*     (2006.01)

(52) U.S. Cl. .................. 423/636; 501/137; 423/594.16; 423/609; 423/598; 423/69; 423/71

(58) Field of Classification Search ....................... None
See application file for complete search history.

(56) References Cited

U.S. PATENT DOCUMENTS

| | | | | |
|---|---|---|---|---|
| 4,874,598 | A * | 10/1989 | Oda et al. | 423/598 |
| 6,254,991 | B1 * | 7/2001 | Kono et al. | 428/403 |
| 6,409,983 | B1 * | 6/2002 | Choi et al. | 423/598 |
| 2001/0026865 | A1 | 10/2001 | Miyoshi | 428/209 |

FOREIGN PATENT DOCUMENTS

| JP | 2001-316114 | 11/2001 |
|---|---|---|
| JP | 2002-234771 | 8/2002 |

* cited by examiner

*Primary Examiner*—Melvin C Mayes
*Assistant Examiner*—Colin W Slifka
(74) *Attorney, Agent, or Firm*—Bacon & Thomas, PLLC

(57)     ABSTRACT

A ceramic powder having a perovskite structure is manufactured by synthesizing a ceramic powder by a dry synthesis process and then heat-treating the synthesized ceramic powder in a solution. The dry synthesis method includes a solid phase synthesis method, an oxalate method, a citric acid method and a gas phase synthesis method.

4 Claims, 1 Drawing Sheet

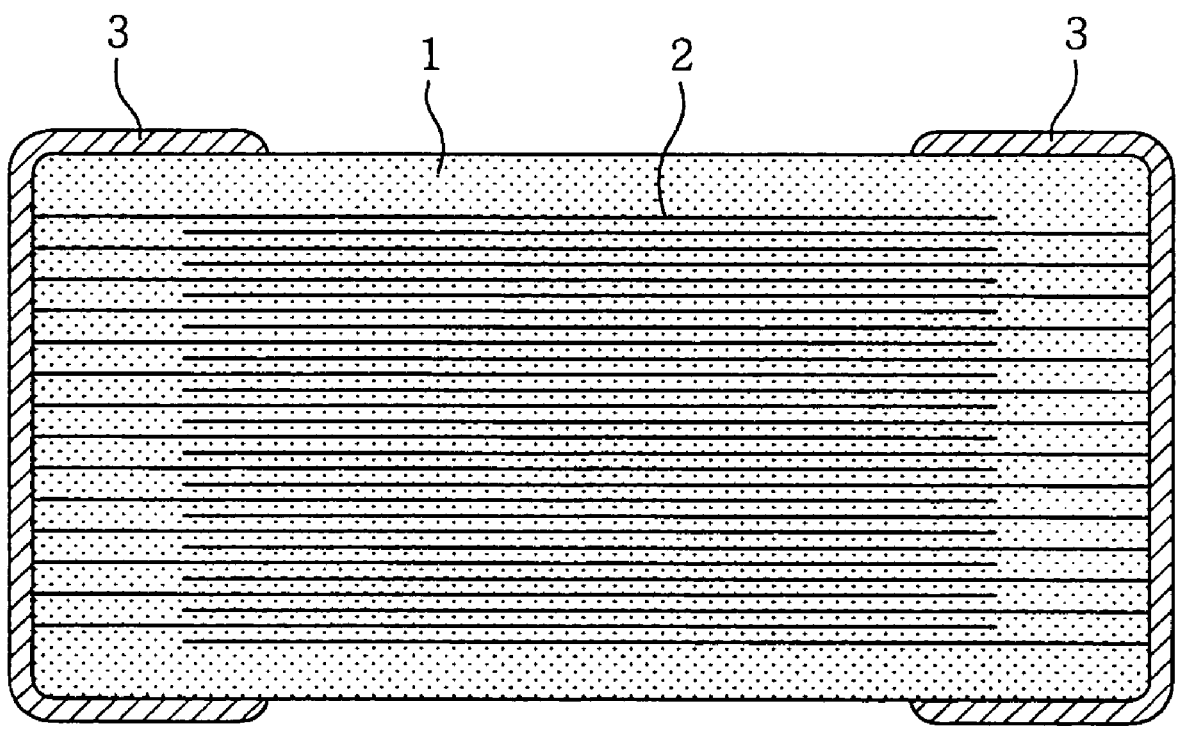

PEROVSKITE CERAMIC POWDER AND ELECTRONIC COMPONENT USING SAME AND MANUFACTURING METHODS THEREOF

This application is a divisional application of U.S. application Ser. No. 10/807,157, filed Mar. 24, 2004, now U.S. Pat. No. 7,271,114 (of which the entire disclosure of the pending, prior application is hereby incorporated by reference).

FIELD OF THE INVENTION

The present invention relates to ceramic powder having a perovskite crystal structure; an electronic component such as a multi-layer ceramic capacitor using same; and manufacturing methods thereof.

BACKGROUND OF THE INVENTION

Ceramic powder having a perovskite crystal structure, e.g., powder of barium titanate ($BaTiO_3$), is widely employed as a dielectric material for use in manufacturing ceramic electronic components such as multi-layer ceramic capacitors. Nowadays, there is an ever-increasing demand for miniaturization of ceramic electronic components. For the miniaturization of a multi-layer ceramic capacitor, for example, thinning of dielectric layers incorporated therein, i.e., thinning of green sheets, needs to be accomplished, which requires a finer ceramic powder with an improved crystallinity of crystal lattice thereof.

The perovskite-structured ceramic powder is manufactured by a synthesis method such as a hydrothermal method, a hydrolysis method, a solid phase synthesis method, an oxalate method, a citric acid method, a gas phase synthesis method, and so forth. Though using any one of these methods allows ceramic powder having a particle diameter of 0.2 μm or less to be obtained, the hydrothermal method or the hydrolysis method is the most preferred among them in general, for such wet methods are more adequate for producing finer powder (see Japanese Patent Laid-open Publication Nos. 2002-234771 and 2001-316114).

In the wet methods, however, OH groups enter a crystal lattice during a synthesizing process, which results in a low crystallinity and a degraded dielectric characteristics. To solve such problem, synthesized ceramic powder is conventionally reheated in the atmosphere for the purpose of removing the residual OH groups in the crystal lattice. Though such reheating has positive effects of inducing a grain growth and improving the crystallinity of crystal lattice and the dielectric characteristics, it also causes an increase in a volume ratio of portions that does not contribute to a dielectric constant since regions within the particles where the OH groups were once present are left in a form of vacancies, thereby lowering a dielectric constant.

SUMMARY OF THE INVENTION

It is, therefore, an object of the present invention to provide a ceramic powder featuring high crystallinity of crystal lattice and advanced dielectric characteristics; an electronic component such as a multi-layer ceramic capacitor using same; and manufacturing methods thereof.

In accordance with a first aspect of the present invention, there is provided a method for manufacturing a ceramic powder having a perovskite structure including the steps of: synthesizing ceramic powder by a non-wet synthesis method; and heat-treating the synthesized ceramic powder in a solution.

In accordance with a second aspect of the present invention, there is provided ceramic powder having a perovskite structure obtained by the above-mentioned manufacturing method, wherein the ceramic powder has a crystal lattice of a tetragonal system; particles of the ceramic powder are equal to or less than 0.2 μm; a c/a axial ratio of the crystal lattice is equal to or greater than 1.006; and a ratio of area occupied by holes in a single particle of the ceramic powder is equal to or less than 5%.

In accordance with a third aspect of the present invention, there is provided ceramic powder having a perovskite structure obtained by the above-mentioned manufacturing method, wherein the ceramic powder has a crystal lattice of a cubic system; particles of the ceramic powder is equal to or less than 0.2 μm; a full-width at half-maximum (FWHM) of an X-ray diffraction (XRD) (111) peak of the crystal lattice is equal to or smaller than 0.270°; and a ratio of area occupied by holes in a single particle of the ceramic powder is equal to or less than 5%.

In accordance with a fourth aspect of the present invention, there is provided ceramic powder having a perovskite structure, wherein the ceramic powder has a crystal lattice of a tetragonal system; particles of the ceramic powder are equal to or less than 0.2 μm; a c/a axial ratio of the crystal lattice is equal to or greater than 1.006; and a ratio of area occupied by holes in a single particle of the ceramic powder is equal to or less than 5%.

In accordance with a fifth aspect of the present invention, there is provided ceramic powder having a perovskite structure, wherein the ceramic powder has a crystal lattice of a cubic system; particles of the ceramic powder is equal to or less than 0.2 μm; a full-width at half-maximum (FWHM) of an X-ray diffraction (XRD) (111) peak of the crystal lattice is equal to or smaller than 0.270°; and a ratio of area occupied by holes in a single particle of the ceramic powder is equal to or less than 5%.

In accordance with a sixth aspect of the present invention, there is provided a ceramic electronic component including a dielectric port-on made of the above-mentioned ceramic powder.

In accordance with a seventh aspect of the present invention, there is provided a method for manufacturing a ceramic electronic component including the step of forming a dielectric portion by employing the above-mentioned ceramic powder.

In accordance with an eight aspect of the present invention, there is provided a multi-layer ceramic capacitor including: a dielectric portion made of the above-mentioned ceramic powder; a plurality of internal electrodes whose edges are alternately exposed at two surfaces of the dielectric portion; and a pair of external electrodes formed at surfaces of the dielectric portion to be connected to the exposed edges of the internal electrodes.

In accordance with a ninth aspect of the present invention, there is provided a method for manufacturing a multi-layer ceramic capacitor including the steps of: forming green sheets by using slurry including the above-mentioned ceramic powder as a main component thereof; forming an array of unsintered internal electrode layers on the green sheets; obtaining a laminated body by compressing a stack, the stack including the green sheets having thereon the unsintered internal electrode layers; attaining unit chips by dicing the laminated body into pieces of a chip size and sintering the pieces, each unit chip having two opposing surfaces at which the sintered internal electrodes are alternately exposed; and forming a pair of external electrodes at surfaces of each unit chip to be connected to exposed edges of the internal electrodes.

BRIEF DESCRIPTION OF DRAWINGS

The above and other objects and features of the present invention will become apparent from the following description of preferred embodiments given in conjunction with the accompanying drawing, which provides a cross sectional view of a multi-layer ceramic capacitor.

DETAILED DESCRIPTION OF THE PREFERRED EMBODIMENTS

An inventive method for manufacturing ceramic powder having a perovskite crystal structure includes two steps in accordance with the present invention: a first step of synthesizing ceramic powder by a non-wet or dry method; and a second step of heat-treating the synthesized ceramic powder in a solution.

The term perovskite-structured ceramic powder used herein denotes powder of $BaTiO_3$ widely employed as a dielectric material; a material in which the Ba site of $BaTiO_3$ is partially or entirely substituted with, e.g., Sr, Ca, Pb, and/or one or more rare earth elements including Y; or a material in which the Ti site of $BaTiO_3$ is partially or entirely substituted with, e.g., Sn, Zr, Nb, W, and/or Sb. That Is, the perovskite-structured ceramic powder includes an oxide in a form of $ABO_3$, wherein the A site of $ABO_3$ is made of, e.g., Ba, Sr, Ca, Pb, and/or one or more rare earth element including Y, while the B site thereof is formed of, e.g., Ti, Sn, Zr, Nb, W and/or Sb.

The non-wet method employed in the first step as mentioned above, denotes a synthesis process for synthesizing ceramic powder in a reactional environment not involving a solvent, which is contrasted with a wet method such as the hydrothermal synthesis or a hydrolysis synthesis for synthesizing ceramic powder in a reactional environment using a solvent such as water. Specifically, the non-wet method includes the solid phase synthesis method, the oxalate method, the citric acid method and the gas phase synthesis method.

Hereinafter, the above-listed non-wet method will be explained in further detail by referring to barium titanate ($BaTiO_3$) as an example.

In the solid phase synthesis method, powder of $BaTiO_3$ is obtained by mixing powders of barium carbonate ($BaCO_3$) and titanium oxide ($TiO_2$) and then calcining the resulting mixture at a temperature equal to or higher than about 800° C. The reaction can be written by the reaction scheme: $BaCO_3 + TiO_2 \rightarrow BaTi_3 + CO_2$.

The oxalate method refers to a process for obtaining $BaTiO_3$ powder by rendering an aqueous solution containing barium (Ba) and titanium (Ti) to react with oxalic acid (($COOH)_2$) to thereby produce double salt including Ba and Ti and then decomposing the double salt by thermonolysis. The reaction for generating the double salts containing Ba and Ti can be represented as: $BaCl_2.2H_2O + TiCl_4 + 2(COOH)_2.2H_2O \rightarrow BaTiO(C_2O_4)_2.4H_2O + 6HCL + H_2O$.

The citric acid method obtains $BaTiO_3$ powder by making solutions of barium citrate and titanium citrate to react with each other to thereby generate double salt including Ba and Ti and then decomposing the double salt by thermonolysis.

The gas phase method is a process for obtaining the $BaTiO_3$ powder by atomizing or spraying solutions of a Ba alcoholate and a Ti alcoholate with oxygen or air into a combustion chamber of a high temperature to decompose them. The reaction can be represented as: $Ba(OCH_3)_2 + Ti(OC_4H_4)_4 + 22O_2 \rightarrow BaTiO_3 + 18CO_2 + 21H_2O$.

The heat treatment performed in the second step is a process for improving crystallinity of a crystal lattice of the synthesized ceramic powder. Specifically, if the crystal lattice has a tetragonal system, the heat treatment is conducted to improve tetragonality of the crystal lattice, while it is performed to enhance cubicity if the crystal lattice is of a cubic system. For the heat treatment, the synthesized ceramic powder is supplied into a solution such as water ($H_2O$) or a predetermined aqueous solution and, then, the heat treatment is carried out by conveying a thermal energy to the synthesized ceramic powder through the solution.

Preferably, the heat treatment temperature is equal to or higher than 80° C. Below 80° C., improvement of crystallinity of the crystal lattice hardly occurs. Further, sufficient heat treatment can be performed if the processing time is not shorter than about 60 minutes, though there is no specific limit in determining a time period for the heat treatment. Also, sufficient effect can be obtained if the pressure applied during the heat treatment is not less than about 0.1 MPa.

Though the enhancement mechanism of crystallinity of the crystal lattice by the heat treatment is not yet fully understood, it was found from experiments and examinations to be described later that a c/a axial ratio of a crystal lattice increases through the heat treatment in case of ceramic powder having a crystal lattice of the tetragonal system, e.g., powder of $BaTiO_3$. It is well known in the art that ferroelectricity cannot be obtained if the c/a axial ratio of a crystal lattice having the tetragonal crystal system is smaller than 1.003 to be of near cubicity. However, even a c/a axial ratio initially smaller than 1.003 was found to have increased to about 1.006 or above by the above-described heat treatment, thereby improving tetragonality of the crystal lattice while obtaining sufficient ferroelectricity.

On the other hand, in case of ceramic powder having a crystal lattice of a cubic system, e.g., powder of strontium titanate ($SrTiO_3$), it was found that a full-width at half-maximum (FWHM) of an X-ray diffraction (XRD) (111) peak of a crystal lattice is reduced while undergoing the heat treatment. The narrowing of the FWHM implies either an improvement of crystallinity (decrease of distortion) or an increase of a crystal size. Further, it was also observed that a dielectric loss tends to be small when crystallinity is high. It is known that, if a FWHM of an XRD (111) peak of the crystal lattice is larger than 0.275°, the dielectric loss increases, degrading the quality of final product. However, the heat treatment of the present Invention allows even an FWHM of a XRD (111) peak initially greater than 0.275° to be reduced down to 0.270° or below, thereby reducing a dielectric loss while improving electrical characteristics.

A solution of pH 7 can be used in the heat treatment. However, in case of employing an alkaline solution having a pH greater than 7 in the heat treatment, ceramic powder having a small particle size distribution (standard deviation), specifically, less than 30%, can be obtained by treating fine particles smaller than an average particle diameter of $BaTiO_3$ synthesized by the above-described non-wet method, e.g., powder smaller than 0.01 μm, in particle diameter. Furthermore, in case of employing a solution of pH greater than 8, particle size distribution can be further reduced and of substantially identical particle diameters can be obtained.

Moreover, though water can be used as well, it is preferred that the solution for use in the heat treatment is an aqueous solution including a predetermined concentration of ions of an A site metal of the ceramic powder in the form of $ABO_3$, wherein the mole number of the site metal ions contained in the aqueous solution is preferably at least 10% of that of the A site metal included in the processing powder. By using the solution having such a composition, the A site metal ions of the ceramic powder can be prevented from being dissolved in the solution, thereby preventing a change in the composition of the ceramic powder.

In the following, there will be described in detail specific examples of a manufacturing method of a $BaTiO_3$ powder in accordance with the present invention. Since $BaTiO_3$ has a crystal lattice of the tetragonal system, a change of crystallinity thereof was estimated as in the following by investigating a change of a c/a axial ratio of the crystal lattice.

EXAMPLE 1

First, predetermined amounts of raw materials of $BaCO_3$ and $TiO_2$ powders were weighed and mixed or obtain a molar ratio of Ba/Ti of 1.0. Then, the solid phase synthesis method was performed by calcining the mixture at a temperature of 900° C., thereby obtaining $BaTiO_3$ power. A particle diameter of the synthesized $BaTiO_3$ powder was equal to or less than 0.2 μm; a particle size distribution (standard deviation/mean diameter of grains) was about 40%; and a c/a axial ratio of the crystal lattice was about 1.003.

Next, the synthesized $BaTiO_3$ powder was put into sealed vessels each being charged with an aqueous solution of barium hydroxide of pH 12 containing therein barium (Ba) with a mole number being equivalent to 20% of that of Ba included in the processing powder supplied thereinto. Then, the sealed vessels were heated at a temperature of 60° C., 70° C., 80° C., 90° C. and 100° C., respectively, so that powder of $BaTiO_3$ was obtained in each vessel.

Table 1 shows measurement results of a particle size distribution and a c/a axial ratio of a crystal lattice of each $BaTiO_3$ powder and an evaluation result therefor.

The particle size distribution of each powder was determined by measuring diameters of particles included in the powder and dividing a standard deviation by a mean value. Specifically, the particle diameters were measured as follows: first, the powder was observed by an SEM (Scanning Electron Microscope) of 50000× power of magnification; then, a picture of a randomly selected portion of the powder was taken in a size of 7.3 cm×9.5 cm; and a Feret's diameter was calculated with respect to the whole particles observed in the picture. If the total number of grains on the picture was smaller than 300, plural SEM images were obtained such that the sum of grains shown thereon becomes at least 300. The Feret's diameter used herein refers to a distance between two parallel lines that are drawn tangent to a grain profile and perpendicular to an ocular scale ("*Particle Size Analysis and technology*", The Society of Powder Technology, The Nikkan Kogyo Shimbun. Ltd., Japan 1994, p. 7).

Further, the c/a axial ratios of crystal lattice were obtained by performing an X-ray diffraction (XRD) on the powders and then calculating a lattice constant by way of fitting obtained profiles by Rietveld analysis (F. Izumi and T. Ikeda, Mater. Sci. Forum. 321~324 (2000) 198).

As can be seen from Table 1 below, c/a axial ratios of crystal lattices were increased equal to or greater than 1.006 in samples 1-3, 1-4 and 1-5 where processing temperatures were set to be equal to or greater than 80° C., which indicates that the processing powders in those samples all experienced enhancement in crystallinity. In contrast, first two samples 1-1 and 1-2 having processing temperatures equal to or lower than 70° C. exhibit no apparent improvement in crystallinity, though they show slight increases in c/a axial ratios.

TABLE 1

| Sample Nos. | Temperature of Processing Solution (° C.) | pH of Processing Solution | Ba molar ratio of Processing Solution | Processing Time (min) | Particle Size Distribution (Standard Deviation/Mean Diameter) | Crystallinity (c/a Axial Ratio) | Evaluation |
|---|---|---|---|---|---|---|---|
| 1-1 | 60 | 12 | 0.2 | 60 | 36% | 1.004 | x |
| 1-2 | 70 | 12 | 0.2 | 60 | 35% | 1.004 | x |
| 1-3 | 80 | 12 | 0.2 | 60 | 21% | 1.006 | ○ |
| 1-4 | 90 | 12 | 0.2 | 60 | 21% | 1.007 | ○ |
| 1-5 | 100 | 12 | 0.2 | 60 | 20% | 1.008 | ○ |

EXAMPLE 2

Powder of $BaTiO_3$ was obtained by the solid phase synthesis method as in Example 1.

Next, eight samples were prepared by putting the synthesized $BaTiO_3$ powder into eight sealed vessels respectively containing solutions of barium hydroxide having pH of values of 6, 7, 8, 9, 10, 11, 12 and 13, respectively, wherein each solution was set to contain Ba with a mole number being equivalent to 20% of that of Ba included in the processing powder supplied thereinto. Then, the solutions were heated at about 100° C. for about 60 minutes, thereby obtaining powder of $BaTiO_3$ in each vessel. The pH-adjusted solutions were prepared by adding in water, acetic acid, aqueous ammonia, or hydroxide salt which has no influence on a physical property of the $BaTiO_3$ powder.

Table 2 provides measurement results of a particle size distribution and a c/a axial ratio of a crystal lattice of each $BaTiO_3$ powder and evaluation results therefor. The particle size distribution and the c/a axial ratio of the crystal lattice were determined by the same methods as in Example 1.

As shown below in Table 2, particle size distributions were measured to be less than 30% in respective samples 2-3, 2-4, 2-5, 2-6, 2-7 and 2-8 where the pH values of the employed processing solutions were set to be equal to or greater than 8. The results also show that a particle size distribution improves as the pH of a processing solution increases. Sample 2-2 using the processing solution of pH 7 also exhibited an improved particle size distribution, though the degree of improvement was not as great as those obtained in the samples 2-3 to 2-8. In contrast, there was observed no change in a particle size distribution in a sample 2-1 using the acid solution of pH 6, which indicates that such an effect as obtained in the samples 2-3 to 2-8 were not attained in the sample 2-1.

TABLE 2

| Sample Nos. | Temperature of Processing Solution (° C.) | pH of Processing Solution | Ba molar ratio of Processing Solution | Processing Time (min) | Particle Size Distribution (Standard Deviation/Mean Diameter) | Crystallinity (c/a Axial Ratio) | Evaluation |
|---|---|---|---|---|---|---|---|
| 2-1 | 100 | 6 | 0.2 | 60 | 40% | 1.003 | x |
| 2-2 | 100 | 7 | 0.2 | 60 | 33% | 1.008 | ○ |
| 2-3 | 100 | 8 | 0.2 | 60 | 29% | 1.008 | ○ |
| 2-4 | 100 | 9 | 0.2 | 60 | 27% | 1.008 | ○ |
| 2-5 | 100 | 10 | 0.2 | 60 | 22% | 1.008 | ○ |
| 2-6 | 100 | 11 | 0.2 | 60 | 21% | 1.009 | ○ |
| 2-7 | 100 | 12 | 0.2 | 60 | 20% | 1.009 | ○ |
| 2-8 | 100 | 13 | 0.2 | 60 | 20% | 1.009 | ○ |

EXAMPLE 3

A $BaTiO_3$ powder was first obtained by the solid phase synthesis method as in Example 1.

Then, the synthesized $BaTiO_3$ powder was put into sealed vessels charged with aqueous solutions of barium hydroxide of pH 12, the solutions containing Ba with mole numbers being equivalent to n times that of Ba contained in the processing powder supplied thereinto (n being 0, 0.1, 0.2. 0.3 and 0.4), and then heated therein at a temperature of 100° C. for about 60 minutes, so that the $BaTiO_3$ powder was obtained in each vessel. The solutions having the different Ba molar ratios were prepared by adding in water barium citrate (Ba (OH)2) or barium chloride ($BaCl_2.2H_2O$).

Table 3 provides measurement results of a particle size distribution and a c/a axial ratio of a crystal lattice of each $BaTiO_3$ powder and evaluation results therefore. The particle size distribution and the c/a axial ratio were determined by using the same methods as described in Example 1.

based on a change of a full-width at half-maximum (FWHM) of an XRD (111) peak of a crystal lattice.

EXAMPLE 4

First, a solution containing raw materials of strontium chloride ($SrCl_2$) and titanium chloride ($TiCl_4$) dissolved therein was made to react with oxalic acid ($(COOH)_2$) to thereby obtain SrTiO $(C_2O_4)_2.4H_2O$. Then, the resulting material was calcined at a temperature of about 800° C., thereby obtaining powder of $SrTiO_3$ by an oxalate synthesis method. Particle diameters of the synthesized $SrTiO_3$ powder were about 0.2 μm or less and a particle size distribution (a standard deviation/a mean diameter of grains) thereof was about 46%. Further, a FWHM of an XRD (111) peak of a crystal lattice was about 0.280°.

Then, the synthesized $SrTiO_3$ was put into sealed vessels each being charged with an aqueous solution of strontium

TABLE 3

| Sample Nos. | Temperature of Processing Solution (° C.) | pH of Processing Solution | Ba molar ratio of Processing Solution | Processing Time (min) | Particle Size Distribution (Standard Deviation/Mean Diameter) | Crystallinity (c/a Axial Ratio) | Change in Ba/Ti molar ratio | Evaluation |
|---|---|---|---|---|---|---|---|---|
| 3-1 | 100 | 12 | 0 | 60 | 21% | 1.006 | 0.010 | ○ |
| 3-2 | 100 | 12 | 0.1 | 60 | 21% | 1.008 | 0.005 | ○ |
| 3-3 | 100 | 12 | 0.2 | 60 | 20% | 1.009 | 0.000 | ○ |
| 3-4 | 100 | 12 | 0.3 | 60 | 20% | 1.009 | −0.001 | ○ |
| 3-5 | 100 | 12 | 0.4 | 60 | 20% | 1.009 | −0.003 | ○ |

As can be seen from Table 3, changes in the values of Ba/Ti molar ratios were not greater than 0.005 and dissolution of Ba serving as A-site components of the processing powders were found to be suppressed in samples 3-2, 3-3, 3-4 and 3-5 where the Ba/Ti molar ratios of the employed solutions were set to be equal to or greater than a value of 0.1.

From the above-described experiments, conclusions can be drawn as follows. The temperature of the heat treatment in the second step is preferably about 80° C. or higher and the pH value of a processing solution employed is preferably 7 or above. Further, a molar ratio of Ba contained in the processing solution is preferably equal to or greater than about 0.1.

In the following, there will be described examples describing the manufacture of powder of strontium titanate ($SrTiO_3$) employing the present invention. Since $SrTiO_3$ has a cubic crystal system, a change of crystallinity thereof was estimated hydroxide of pH 12 containing wherein strontium (Sr) with a mole number being equivalent to 20% of that of Sr included in the processing powder supplied thereinto. Then, the sealed vessels were heated at a temperature 60° C., 70° C., 80° C., 90° C., and 100° C., respectively, for about 60 minutes, thereby obtaining the $SrTiO_3$ powder in each vessel.

Table 4 provides measurement results of a particle size distribution and a FWHM of an XRD (111) peak of a crystal lattice of each $SrTiO_3$ powder and evaluations therefor.

The particle size distribution was determined by the same method as described in Example 1. The FWHM of the XRD (111) peak of the crystal lattice was measured by performing an X-ray diffraction on the powder and fitting profiles so obtained by Rietveld analysis (F. Izumi and T. Ikeda, Mater. Sci. Forum. 321~324 (2000) 198).

TABLE 4

| Sample Nos. | Temperature of Processing Solution (° C.) | pH of Processing Solution | Sr molar ratio of Processing Solution | Processing Time (min) | Particle Size Distribution (Standard Deviation/Mean Diameter) | Crystallinity (FWHM of (111)) | Evaluation |
|---|---|---|---|---|---|---|---|
| 4-1 | 60 | 12 | 0.2 | 60 | 35% | 0.280° | x |
| 4-2 | 70 | 12 | 0.2 | 60 | 34% | 0.275° | x |
| 4-3 | 80 | 12 | 0.2 | 60 | 23% | 0.239° | ○ |
| 4-4 | 90 | 12 | 0.2 | 60 | 21% | 0.230° | ○ |
| 4-5 | 100 | 12 | 0.2 | 60 | 21% | 0.228° | ○ |

As can be seen from Table 4, FWHMs of XRD (111) peaks of crystal lattices were reduced below 0.240° while improving crystallinity of the processing powders in respective samples 4-3 to 4-5 in which the temperatures of the processing solutions were set to be equal to or greater than about 80° C. In contrast, FWHMs of XRD (111) peaks of crystal lattices were found to be above 0.270° in samples 4-1 and 4-2 in each of which the temperature of the processing solution was not greater than 70° C., which indicates that such an effect as obtained in the samples 4-3 to 4-5 was not attained in the samples 4-1 and 4-2.

EXAMPLE 5

First, a SrTiO$_3$ powder was obtained by the oxalate synthesis method, as in Example 1.

Then, the synthesized SrTiO$_3$ powder was put into sealed vessels charged with aqueous solutions of strontium hydroxide containing Sr with a mole number being equivalent to 20% of that of Sr contained in the processing powder supplied thereinto, wherein pH values of the solutions were set as 6, 7, 8, 9, 10, 11 and 12, respectively. Thereafter, the respective sealed vessels were heated at a temperature of about 100° C. for about 60 minutes, thereby obtaining the SrTiO$_3$ powder in each vessel. The pH-adjusted solutions were prepared by adding in water strontium hydroxide or acetic acid having no influence on a physical property of the SrTiO$_3$ powder.

Table 5 provides measurement results of a particle size distribution and a FWHM of an XRD (111) peak of a crystal lattice of each SrTiO$_3$ powder and evaluation results therefor. The particle size distribution and the FWHM of the XRD (111) peak were determined by the same methods as those employed in Example 4.

As can be seen from Table 5, particle size distributions were found to be below 30% in respective samples 5-2 to 5-7 where the pH values of the employed solutions were set to be equal to or greater than a value of 7. Further, in the samples 5-2 to 5-7, it was also observed that the particle size distributions improve as the pH values of the processing solutions increase. In contrast, in a sample 5-1 where the pH value of the processing solution was set to be 6 (acid), no substantial change in a particle size distribution was observed, which indicates that the effects obtained in the samples 5-2 to 5-7 were not attained in the sample 5-1.

TABLE 5

| Sample Nos. | Temperature of Processing Solution (° C.) | pH of Processing Solution | Sr molar ratio of Processing Solution | Processing Time (min) | Particle Size Distribution (Standard Deviation/Mean Diameter) | Crystallinity ((111) FWHM) | Evaluation |
|---|---|---|---|---|---|---|---|
| 5-1 | 100 | 6 | 0.2 | 60 | 44% | 0.280° | x |
| 5-2 | 100 | 7 | 0.2 | 60 | 29% | 0.246° | ○ |
| 5-3 | 100 | 8 | 0.2 | 60 | 27% | 0.242° | ○ |
| 5-4 | 100 | 9 | 0.2 | 60 | 26% | 0.236° | ○ |
| 5-5 | 100 | 10 | 0.2 | 60 | 25% | 0.233° | ○ |
| 5-6 | 100 | 11 | 0.2 | 60 | 23% | 0.230° | ○ |
| 5-7 | 100 | 12 | 0.2 | 60 | 21% | 0.228° | ○ |

EXAMPLE 6

First, a SrTiO$_3$ powder was obtained by the oxalate synthesis method, as in Example 4.

Next, the synthesized SrTiO$_3$ powder was put into sealed vessels charged with aqueous solutions of strontium hydroxide of pH 12, the solutions containing Sr with mole numbers being equivalent to n times that of Sr contained in the processing powder supplied thereinto n being 0, 0.1, 0.2, 0.3 and 0.4, respectively), and heated therein at a temperature of about 100° C. for about 60 minutes, thereby obtaining powder of SrTiO$_3$ in each vessel. The solutions having the different molar ratios of Sr were prepared by adding in water strontium hydroxide (Sr(OH)$_2$.8H$_2$O), strontium chloride (SrCl$_2$.6H$_2$O) or strontium acetate (Sr(CH$_3$COO)$_2$.½H$_2$O).

Table 6 shows measurement results of a particle size distribution and a FWHM of an XRD (111) peak of a crystal lattice of each SrTiO$_3$ powder and evaluation therefor. The particle size distribution and the HWHM of the XRD (111) peak of the crystal lattice were determined by the same methods as those employed in Example 4.

As can be seen from Table 6, it was observed that a change in a molar ratio of Sr/Ti was not greater than 0.006 in each of samples 6-2 to 6-5 where the molar ratios of Sr were set to be equal to or greater than a value of 0.1, which shows that dissolution of Sr serving as an A site component of the processing powders was suppressed in those samples.

TABLE 6

| Sample Nos. | Temperature of Processing Solution (° C.) | pH of Processing Solution | Sr molar ratio of Processing Solution | Processing Time (min) | Particle Size Distribution (Standard Deviation/Mean Diameter) | Crystallinity (FWHM of (111) Peak) | Change in Sr/Ti molar ratio | Evaluation |
|---|---|---|---|---|---|---|---|---|
| 6-1 | 100 | 12 | 0 | 60 | 23% | 0.238° | 0.010 | ○ |
| 6-2 | 100 | 12 | 0.1 | 60 | 22% | 0.231° | 0.006 | ○ |
| 6-3 | 100 | 12 | 0.2 | 60 | 21% | 0.228° | 0.000 | ○ |
| 6-4 | 100 | 12 | 0.3 | 60 | 22% | 0.227° | −0.001 | ○ |
| 6-5 | 100 | 12 | 0.4 | 60 | 21% | 0.228° | −0.002 | ○ |

Conclusions drawn from the above-described experiments are as follows: the temperature of the heat treatment in the second step is preferably equal to or greater than about 80° C.; a processing solution is preferably alkaline having a pH equal to or greater than a value of 7; and a molar ratio of Sr included in the processing solution is preferably equal to or greater than about 0.1.

Ceramic powder obtained through the first and the second step is then subsequently subjected to a drying process and a grounding process, and thus obtained final ceramic powder is used in fabricating dielectric portions of a ceramic electronic component such as a multi-layer ceramic capacitor.

Referring to FIG. 1, there is illustrated a multi-layer ceramic capacitor having a dielectric portion formed of the ceramic powder obtained as described above. The capacitor includes the dielectric portion 1, a plurality of internal electrodes 2 alternately exposed at each of two opposite lengthwise end surfaces of the dielectric portion 1 and a pair of external electrodes 3 formed at the two opposite lengthwise end portions of the dielectric portion 1, wherein the exposed edges of the plurality of internal electrodes 2 are alternately connected to one of the pair of the external electrodes 3.

The multi-layer ceramic capacitor configured as described is manufactured as follows.

First, slurry is formed by mixing the ceramic powder with a binder, e.g., a polyvinylbutyral resin, and an organic solvent, e.g., ethanol, wherein a plasticizer or a dispersing agent can be added to the mixture, if required. Then, thus obtained slurry is coated on a resin film made of, e.g., polyethylene terephthalate with a predetermined thickness by employing a die coater or a doctor blade technique, and then the coated slurry is dried to thereby obtain green sheets. Next, an m×n (m and n being integers) array of electrode paste including powder of a base metal, e.g., Ni, is printed on the green sheets with a preset thickness by a screen printing or a gravure printing method. The printed electrode paste is then dried so that an m×n array of unsintered internal electrode layers is obtained. Subsequently, the green sheets having thereon the unsintered internal electrode layers are cut into pieces of a predetermined size and then delaminated from the resin film. Then, a prescribed number of delaminated green sheets and bare green sheets having thereon no internal electrode layers are stacked together and compressed, thereby obtaining a laminated body. The laminated body is diced into pieces of a chip size, which are then sintered to thereby attain unit chips each having a shape of a rectangular parallelopiped. Alternately exposed at two opposite lengthwise end portions of each unit chip are the sintered internal electrodes. Next, the above-described electrode paste is coated again on both lengthwise end portions of each unit chip and then baked to thereby obtain a pair of external electrodes on each unit chip. Alternatively, it may also be appropriate to first apply the electrode paste on two opposite lengthwise end portions of each unsintered chip and then carry out the sintering of the coated paste and the unsintered chips simultaneously.

The ceramic powder obtained by the above-described method of the present invention yields high crystallinity of crystal lattice and advanced dielectric characteristics. Therefore, the quality of the multi-layer ceramic capacitors manufactured by using such ceramic powder can be considerably enhanced. Further, when fabricating a ceramic green sheet having a thickness of about 1 μm in order to meet the recent demand for a further scaled-down multi-layer ceramic capacitor with higher capacitance, a greater number of grain boundaries can be formed along a thickness direction of the sheet if the particle diameter of the ceramic power is not greater than 0.2 μm, resulting in a lengthened lifetime of the capacitor.

If the particle diameter is smaller than 0.05 μm, however, desired dielectric characteristics may not be obtained. Thus, the particle diameter of the ceramic powder practically is set to range from 0.05 to 0.2 μm even in a case of scaling down the thickness of the green sheet.

A maximum particle diameter of ceramic powder obtained by the above-described manufacturing method depends on particle diameters of ceramic powder synthesized by a non-wet method in the first step. However, when synthesizing $BaTiO_3$ by the sold phase synthesis method as in samples 7-6 to 7-15 in Table 7, it is possible to obtain ceramic powder having particle diameters not greater than 0.2 μm or 0.1 μm by way of selecting specific surface areas ($m^2/g$) of raw materials. Therefore, there will be no problem in fabricating ceramic powder having particle diameters ranging from 0.05 μm to 0.2 μm by using the manufacturing method of the present invention.

Moreover, in the ceramic electronic component such as the multi-layer capacitor including the dielectric portion, presence of holes within particles results in a reduction of a dielectric constant of the dielectric portion. Thus, occurrence of the holes should be prevented in the manufacturing process of the ceramic powder. In the manufacturing process of the present invention, the first step of synthesizing the ceramic powder does not involve generation of holes within particles since the synthesis of the powder is conducted by a dry method. Since, however, there is likelihood that holes may be generated under the heat treatment condition in the second step, special care is required in conducting the heat treatment in the second step.

For example, if a filling ratio of $BaTiO_3$ per unit volume is 100%, a decrement of the dielectric constant is 0, basically. However, if the filling ratio is reduced due to the existence of the holes within the particles, the dielectric constant is greatly lowered. If the filling ratio is 99.5%, the dielectric constant is lowered by about 7% in calculation and, if the filling ratio is reduced to 98.5%, the decrement of the dielectric constant is calculated to be as large as about 11%.

TABLE 7

| Sample Nos. | Specific Surface Area of Raw Materials (m²/g) BaCO₃ | TiO₂ | Particle Diameters of Synthesized BaTiO₃ Powder (μm) |
|---|---|---|---|
| 7-1 | 5 | 7 | >0.2 |
| 7-2 | 10 | 7 | >0.2 |
| 7-3 | 10 | 20 | >0.2 |
| 7-4 | 14 | 7 | >0.2 |
| 7-5 | 14 | 20 | >0.2 |
| 7-6 | 14 | 30 | ≦0.2 |
| 7-7 | 14 | 40 | ≦0.2 |
| 7-8 | 20 | 20 | ≦0.2 |
| 7-9 | 20 | 30 | ≦0.2 |
| 7-10 | 20 | 40 | <0.1 |
| 7-11 | 20 | 50 | <0.1 |
| 7-12 | 30 | 20 | ≦0.2 |
| 7-13 | 30 | 30 | <0.2 |
| 7-14 | 30 | 40 | ≦0.1 |
| 7-15 | 30 | 50 | <0.1 |

It is preferable to limit a reduction of the dielectric constant not greater than 5% including errors. Therefore, a ratio of area occupied by holes within a single particle is set to be not greater than 5%, preferably. The ratio of the area of the holes is determined by observing ceramic powder by using a TEM (transmission type electron microscope) and calculating a ratio of an area of the holes to a total area of the particles represented two-dimentionally.

As described above, the ceramic powder manufacturing method of the present invention enables fabrication of perovskite-structured ceramic powder yielding high crystallinity and advanced dielectric characteristics. In case the ceramic powder thus obtained has a crystal lattice of the tetragonal system, particle diameters are found to be not grater than 0.2 μm; a c/a axial ratio of crystal lattice, at least 1.006; and a ratio of area occupied by holes in a single grain, equal to or less than 5%. Further, when applied to fabricating ceramic powder having a crystal lattice of a cubic system, the present method can manufacture ceramic powder having particle diameters not greater than 2 μm, a FWHM of XRD (111) peak of crystal lattice not greater than 0.270° and a ratio of area occupied by holes in a single particle not greater than 5%.

Furthermore, if the ceramic powder obtained in accordance with the present invention is employed to fabricate dielectric portions of a ceramic electronic component, e.g., a multi-layer ceramic capacitor, a high capacitance and a high quality multi-layer ceramic capacitor can be manufactured while contributing to a size reduction as well, for it features high crystallinity of crystal lattice and improved dielectric characteristics as described above.

While the invention has been shown and described with respect to the preferred embodiments, it will be understood by those skilled in the art that various changes and modifications may be made without departing from the spirit and scope of the invention as defined in the following claims.

What is claimed is:

1. A method for manufacturing a ceramic powder having a perovskite structure comprising the steps of:
   synthesizing ceramic powder by a non-wet synthesis method; and
   heat-treating the synthesized ceramic powder in a solution, wherein the synthesized ceramic powder is in a form of $ABO_3$ and a solution employed in the heat-treating sten contains ions of A-site metal of the ABO3 form, and
   wherein the mole number of the A-site metal ions in the solution is equal to or greater than 10% of that of the A-site metal included in the synthesized ceramic powder.

2. The method of claim 1, wherein the non-wet synthesis method is one of a solid phase synthesis method, an oxalate method, a citric acid method and a gas phase synthesis method.

3. The method of claim 1 or 2, wherein a heat treatment temperature is equal to or greater than 80° C.

4. The method of claim 1 or 2, wherein a solution employed in the heat-treating step has a pH greater than 7.

* * * * *